United States Patent [19]

Bailey

[11] Patent Number: 5,802,559
[45] Date of Patent: *Sep. 1, 1998

[54] MECHANISM FOR WRITING BACK SELECTED DOUBLEWORDS OF CACHED DIRTY DATA IN AN INTEGRATED PROCESSOR

[75] Inventor: Joseph A. Bailey, Austin, Tex.

[73] Assignee: Advanced Micro Devices, Inc., Sunnyvale, Calif.

[*] Notice: The term of this patent shall not extend beyond the expiration date of Pat. No. 5,557,769.

[21] Appl. No.: 743,393

[22] Filed: Nov. 4, 1996

Related U.S. Application Data

[63] Continuation of Ser. No. 246,838, May 20, 1994, abandoned.

[51] Int. Cl.$^6$ ............................ G06F 12/00; G06F 13/00
[52] U.S. Cl. ................... 711/118; 711/117; 711/141; 711/143; 711/144; 711/146; 711/169; 711/210; 365/189.03
[58] Field of Search ............... 364/DIG. 1, 964.342, 364/243.4, 189.03; 395/420, 444, 445, 468, 470, 471, 473, 496; 365/189.03; 711/189.03, 210, 117, 118, 141, 143, 144, 146, 169

[56] References Cited

U.S. PATENT DOCUMENTS

| | | | |
|---|---|---|---|
| 5,155,824 | 10/1992 | Edenfield et al. | 395/3 |
| 5,195,089 | 3/1993 | Sindhu et al. | 370/85.1 |
| 5,197,144 | 3/1993 | Edenfield et al. | 395/470 |
| 5,226,144 | 7/1993 | Moriwaki et al. | 395/448 |
| 5,317,720 | 5/1994 | Stamm et al. | 395/470 |
| 5,325,504 | 6/1994 | Tipley et al. | 395/455 |
| 5,353,423 | 10/1994 | Hamid et al. | 395/470 |

(List continued on next page.)

FOREIGN PATENT DOCUMENTS 0 397 995  3/1990  European Pat. Off.
A-05 282208  2/1994  European Pat. Off.

OTHER PUBLICATIONS

Edenfield, R., et al., "The 68040 On–Chip Memory Subsystem" *Institute of Electrical and Electronics Engineers,* (Feb. 1990), Computer Society International Conference (COMPCON), Spring Meeting, Los Alamitos, No. Conf. 25, pp. 264–269.

Atkins, M., "Performance and the I860 Microprocessor", *IEEE Micro,* (Oct. 1, 1991), vol. 11, No. 5, pp. 24–27, 72–78.

Handy, "The Cache Memory Book", Academic Press, Inc., San Diego, California (1993).

*Primary Examiner*—Tod R. Swann
*Assistant Examiner*—Tuan V. Thai
*Attorney, Agent, or Firm*—Conley, Rose & Tayon; B. Noel Kivlin

[57] ABSTRACT

An integrated processor is provided that includes a cache controller which keeps track of a physical address in the system memory which corresponds to each entry within the cache memory. The address tag and state logic circuit further contains state information consisting of a dirty bit allocated for each doubleword (or word) within each line as well as a valid bit for each line. The dirty bit allocated for each doubleword indicates whether that doubleword is dirty or clean, and the valid bit for each line indicates whether the line is valid or invalid. The cache controller further includes a snoop write-back control circuit which monitors the local bus to determine whether a memory cycle has been executed by an alternate bus master on the local bus. During such a memory cycle of an alternate bus mater, a comparator circuit determines whether a cache hit has occurred. If a cache hit occurs and one or more dirty doublewords are contained within the corresponding line, the snoop write-back control circuit initiates a snoop write-back cycle to write-back only those doublewords within the line that is marked dirty. If two or more doublewords within the hit cache line are marked dirty, the snoop write-back control circuit effectuates the write-back of the dirty data by executing a burst write cycle on the local bus.

12 Claims, 6 Drawing Sheets

U.S. PATENT DOCUMENTS

| | | | |
|---|---|---|---|
| 5,355,467 | 10/1994 | MacWilliams et al. | 395/473 |
| 5,359,723 | 10/1994 | Mathews et al. | 395/470 |
| 5,426,606 | 6/1995 | Takai | 365/189.05 |
| 5,426,765 | 6/1995 | Stevens et al. | 395/458 |
| 5,428,761 | 6/1995 | Herlihy et al. | 395/470 |
| 5,483,640 | 1/1996 | Isfeld et al. | 395/200.03 |
| 5,488,709 | 1/1996 | Chan | 395/445 |
| 5,594,765 | 1/1997 | Oh | 377/4 |

MECHANISM FOR WRITING BACK SELECTED DOUBLEWORDS OF CACHED DIRTY DATA IN AN INTEGRATED PROCESSOR

This application is a continuation of application Ser. No. 08/246,838 filed May 20, 1994 now abandoned.

BACKGROUND OF THE INVENTION

1. Field of the Invention

This invention relates to computer systems and more particularly to computer systems that employ cache memory subsystems. The invention also relates to integrated processors and bus transfer mechanisms employed within computer systems.

2. Description of the Relevant Art

Cache-based computer architectures are typically associated with specialized bus transfer mechanisms to support efficient utilization of the cache memory and to maintain data coherency. A cache memory is a high-speed memory unit interposed in the memory hierarchy of a computer system between a slower system memory and a processor to improve effective memory transfer rates and accordingly improve system performance. The name refers to the fact that the small cache memory unit is essentially hidden and appears transparent to the user, who is aware only of a larger system memory. The cache is usually implemented by semiconductor memory devices having speeds that are comparable to the speed of the processor, while the system memory utilizes a less costly, lower-speed technology. The cache concept anticipates the likely reuse by the microprocessor of selected data in system memory by storing a copy of the selected data in the cache memory.

A cache memory typically includes a plurality of memory sections, wherein each memory section stores a block or a "line" of two or more words of data. For systems based on the particularly popular model 80486 microprocessor, a line consists of four "doublewords" (wherein each doubleword comprises four 8-bit bytes). Each line has associated with it an address tag that uniquely identifies of which line of system memory it is a copy. When a read request originates in the processor for a new word (or a new doubleword or a new byte), whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

In addition to using a cache memory to retrieve data, the processor may also write data directly to the cache memory instead of to the system memory. When the processor desires to write data to memory, an address tag comparison is made to determine whether the line into which data is to be written resides in the cache memory. If the line is present in the cache memory, the data is written directly into the line. This event is referred to as a cache write "hit". As will be explained in greater detail below, in many systems a data "dirty bit" for the line is then set. The dirty bit indicates that data stored within the line is dirty (i.e., has been modified), and thus, before the line is deleted from the cache memory or overwritten, the modified data must be written into system memory.

If the line into which data is to be written does not exist in the cache memory, the line is either fetched into the cache memory from system memory to allow the data to be written into the cache, or the data is written directly into the system memory. This event is referred to as a cache write "miss". A line which is overwritten or copied out of the cache memory when new data is stored in the cache memory is referred to as a victim block or a victim line.

Cache memories can be optimized according to a number of different techniques. One aspect that affects system performance and design complexity is the handling of writes initiated by the processor or by an alternate bus master. As explained previously, because two copies of a particular piece of data or instruction code can exist, one in system memory and a duplicate copy in the cache, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent. Similarly, in systems with an alternate bus master, write cycles to system memory by the alternate bus master modify data in system memory but not in the cache memory. Again, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and thus the two storage systems are always coherent. In a second technique, a "write-back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

An incoherence between the cache memory and system memory during a write operation by an alternate bus master is handled somewhat differently. For a system that employs write-back caching, one of a variety of bus monitoring or "snooping" techniques may be implemented to determine whether certain lines of data within the cache memory should be invalidated or written-back to system memory when the alternate bus master attempts to write data to system memory. For one such technique as specified by the particularly popular "MESI" protocol, when an alternate bus master attempts to write data to system memory, a cache controller determines whether a corresponding line of data is contained within the cache memory. If a corresponding line is not contained by the cache memory, no additional action is taken by the cache controller, and the write cycle initiated by the alternate bus master is allowed to complete. If, on the other hand, a corresponding line of data is contained in the cache memory, the cache controller determines whether that line of data is dirty or clean. If the line is clean, the line is marked invalid by the cache controller and the transfer of data from the alternate bus master into system memory is allowed to complete. The line of data must be marked invalid since the modified (and thus the most up-to-date) data is now contained only within the system memory (following completion of the write cycle by the alternate bus master). If the line of data is instead dirty, a snoop write-back cycle is initiated by the cache controller which causes the alternate bus master to "back-off" and release mastership of the system bus. The cache controller then causes the entire line of dirty data within the cache memory to be written back into system memory. The snoop write-back cycle may be accomplished by executing a burst write cycle to system memory. As is well known to those of skill in the art, during the data phase of a burst cycle, a new word (or doubleword) may be written to the system memory for each of several successive clock cycles without intervening address phases. The fastest burst cycle (no wait states) requires two clock cycles for the first word (one clock for the address, one clock for the corresponding word), with subsequent words returned from sequential addresses on every subsequent clock cycle.

After the snoop write-back cycle completes, the alternate bus master re-obtains mastership of the system bus, and the write cycle by the alternate bus master is again executed. At this point, the new data is allowed to be written into the system memory. It is noted that the snoop write-back cycle ensures that data coherency is maintained even if the writing of data from the alternate bus master does not involve an entire cache line.

An incoherence between the cache memory and the system memory during a read operation by an alternate bus master is treated similarly. When an alternate bus master attempts to read data from system memory, the cache controller determines whether a corresponding line of data is contained within the cache memory. If a corresponding line is contained by the cache memory, and if the corresponding line is dirty, a snoop write-back cycle is initiated by the cache controller which causes the alternate bus master to back-off and release mastership of the system bus. The cache controller then causes the entire line of dirty data within the cache memory to be written back into system memory. After the write-back cycle completes, the alternate bus master re-obtains mastership of the system bus, and the read cycle by the alternate bus master is re-initiated. At this point, the data within the system memory is allowed to be read.

When the snoop write-back cycles as described above are executed to maintain data coherency during read and write operations of an alternate bus master, the bandwidth of the system bus is degraded since the alternate bus master must wait for the write-back cycle to complete before performing its desired data transfer. For words (or doublewords) that are not dirty, this write-back operation is unnecessary. Therefore, although the snoop write-back technique has been generally successful in maintaining the integrity of data where an incoherency exists between the cache memory and system memory prior to the execution of a memory cycle by the alternate bus master, the bandwidth of the computer system becomes limited since the system bus is occupied with unnecessary bus traffic. As a result, overall system performance may be degraded.

SUMMARY OF THE INVENTION

The problems outlined above are in large part solved by an integrated processor employing a mechanism to burst cached dirty data according to the present invention. In one embodiment, an integrated processor is provided that includes CPU core, a cache memory, and a cache controller coupled to a local bus via a local bus interface. The integrated processor further includes a memory controller for coupling a system memory to the local bus, and a bus interface unit for coupling external peripheral devices to the local bus. The cache controller includes an address tag and state logic circuit which keeps track of a physical address in the system memory which corresponds to each entry within the cache memory. The address tag and state logic circuit further contains state information consisting of a dirty bit allocated for each doubleword (or word) within each line as well as a valid bit for each line. The dirty bit allocated for each doubleword indicates whether that doubleword is dirty or clean, and the valid bit for each line indicates whether the line is valid or invalid. The cache controller further includes a snoop write-back control circuit which monitors the local bus to determine whether a memory cycle has been executed by an alternate bus master on the local bus. During such a memory cycle of an alternate bus master, a comparator circuit determines whether a cache hit has occurred. If a cache hit occurs and one or more dirty doublewords are contained within the corresponding line, the snoop write-back control circuit initiates a snoop write-back cycle to write-back only those doublewords within the line that are marked dirty. If two or more doublewords within the hit cache line are marked dirty, the snoop write-back control circuit effectuates the write-back of the dirty data by executing a burst write cycle on the local bus. The snoop write-back control circuit is configured to write-back any dirty doublewords within the line during the designated burst cycle even if the dirty doublewords are non-sequential. In accordance with the integrated processor, only those doublewords within a particular cache line that are dirty are written back to system memory when a snoop write-back cycle is executed, and the write-back of non-sequential dirty data is accommodated during a single burst cycle. As a result, the integrated processor advantageously reduces the traffic on the local bus and thereby improves the overall bandwidth of the computer system.

Broadly speaking, the present invention contemplates a computer system comprising a cache memory operatively coupled to a bus, a processing unit coupled to the cache memory, a system memory, and a system memory controller operatively coupled to the bus and to the system memory for controlling the storage and retrieval of data within the system memory. The computer system further comprises an alternative bus master device coupled to the bus, wherein the alternate bus master device is capable of executing a memory cycle on the bus. A cache controller is operatively coupled to the cache memory and to the bus for controlling the storage and retrieval of data within the cache memory. The cache controller includes a tag logic circuit capable of storing a plurality of line addresses indicative of a plurality of lines of data stored within the cache memory and capable of storing a plurality of dirty bits associated with each line. A separate dirty bit corresponds to a separate doubleword of data within each line. The cache controller further includes a snoop control circuit for controlling the write-back to the system memory of dirty data stored within the cache memory wherein the snoop control circuit is capable of writing-back selected doublewords of a given line that are dirty based upon a status of the plurality of dirty bits.

The invention further contemplates an integrated processor comprising a CPU core, a cache memory operatively coupled to a bus, a system memory controller operatively coupled to the bus for controlling the storage and retrieval of data within a system memory, and an alternative bus master device coupled to the bus. The alternate bus master device is capable of executing a memory cycle on the bus. A cache controller is operatively coupled to the cache memory and to the bus for controlling the storage and retrieval of data within the cache memory. The cache controller includes a tag logic circuit capable of storing a plurality of line addresses indicative of a plurality of lines of data stored within the cache memory and capable of storing a plurality of dirty bits associated with each line. A separate dirty bit corresponds to a separate doubleword of data within each line. The cache controller further includes a snoop control circuit for controlling the write-back to the system memory of dirty data stored within the cache memory wherein the snoop control circuit is capable of writing-back selected doublewords of a given line that are dirty based upon a status of the plurality of dirty bits.

The invention finally contemplates a snoop control method for a cache-based computer system comprising the steps of storing a plurality of line addresses indicative of a plurality of lines of data within a cache memory, storing a plurality of dirty bits associated with each line, wherein a separate dirty bit correspondes to each doubleword of data within each line, and initiating a memory cycle to transfer data from an alternate bus master to a system memory. The method comprises the further steps of detecting the memory cycle within a cache controller, determining whether a corresponding line resides within the cache memory, and selectively writing back to the system memory one or more dirty doublewords within the corresponding line.

BRIEF DESCRIPTION OF THE DRAWINGS

Other objects and advantages of the invention will become apparent upon reading the following detailed description and upon reference to the accompanying drawings in which.

Figure 1:
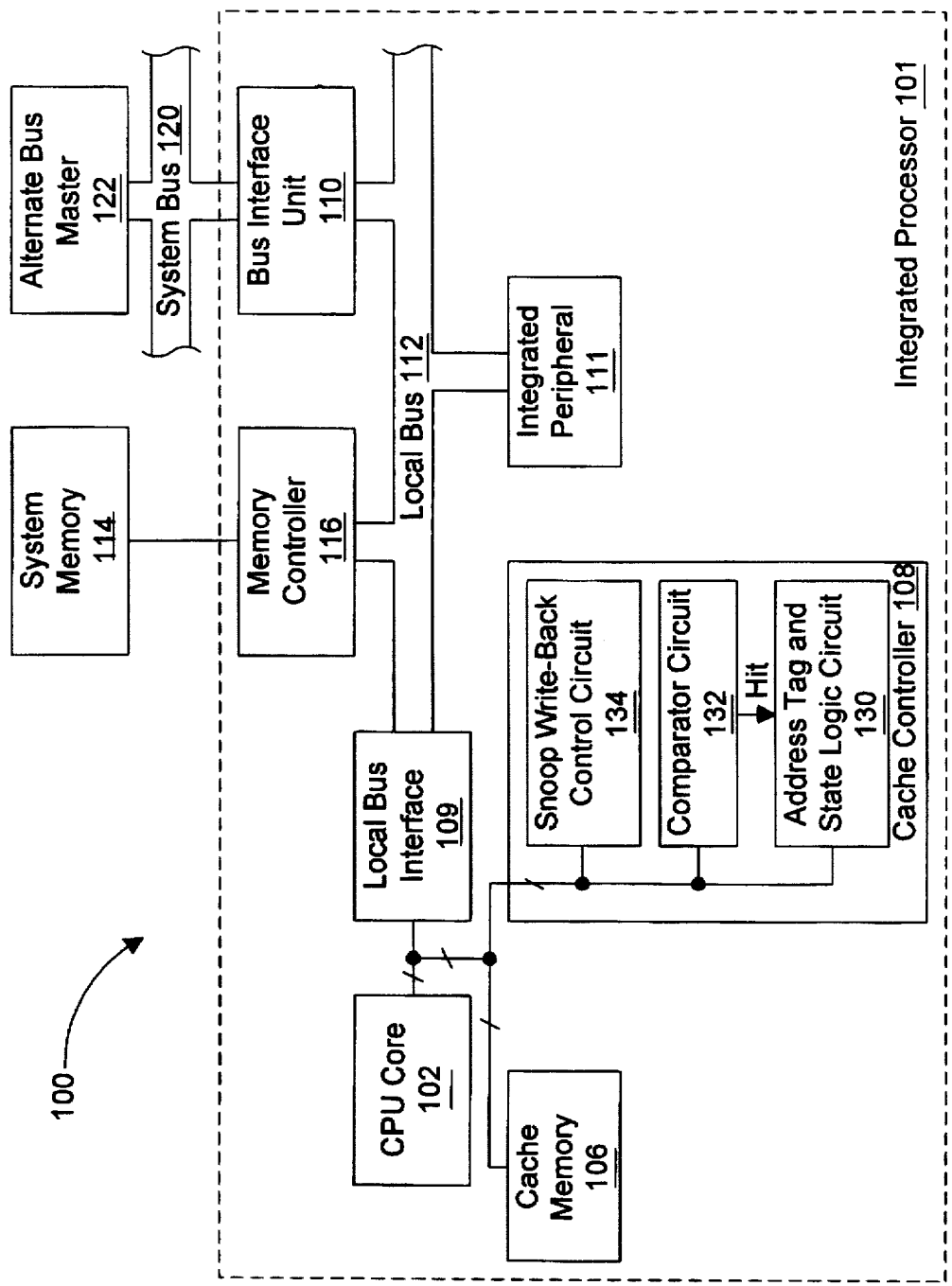
FIG. 1 is a block diagram of a computer system including an integrated processor that employs a cache controller in accordance with the present invention.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of a computer system 100 to which the present invention is adapted. An integrated processor 101 includes a CPU core 102 coupled to a cache memory 106 and a cache controller 108. CPU core 102, cache memory 106, and cache controller 108 are coupled to a local bus 112 via a local bus interface 109. Integrated processor 101 further includes a bus interface unit 110, an integrated peripheral 111, and a memory controller 116 coupled to CPU core 102 via local bus 112 and local bus interface 109. Bus interface unit 110 provides an interface between an external system bus 120 and the local bus 112. An external system memory 114 is coupled to local bus 112 through memory controller 116. An alternate bus master 122 is finally shown coupled to system bus 120.

In its illustrated form, computer system 100 embodies a single processor, single-cache architecture. It is understood, however, that the present invention may be adapted to multi-processor and/or multi-cache systems. It is further understood that a variety of other devices may be coupled to system bus 112.

System bus 120 may be any suitable bus for coupling peripheral devices such as CD-ROM units and local area network (LAN) devices to the internal components of integrated processor 101. Exemplary peripheral bus standards include the ISA (Industry Standard Architecture) bus, the EISA (Extended Industry Standard Architecture) bus and the PCI (Peripheral Connect Interface) bus. Bus interface unit 110 provides an interface between system bus 120 and local bus 112.

CPU core 102 is a data processing unit that implements a predetermined instruction set. Exemplary processing units include the models 80386 and 80486 microprocessors.

Cache controller 108 orchestrates and manages the transfer of data between processing unit 102, cache memory 106 and local bus 112. In the preferred form, processing unit 102, cache memory 106 and cache controller 108 operate concurrently to provide maximum sustained performance in the computer system 100.

Local bus 112 has a predetermined bit width and is the integrated processor's primary bus. System memory 114 is a physical memory of a predetermined size and may be implemented with DRAM (dynamic random access memory). Memory controller 116 controls and orchestrates the transfer of data, address and control signals communicating between local bus 112 and system memory 114.

Integrated peripheral 111 is illustrative of a variety of possible peripheral devices incorporated as an integral part of integrated processor 101. Exemplary peripheral devices include a DMA controller, an interrupt controller, and a timer.

Bus master 122 is illustrative of a variety of bus mastering devices. Exemplary alternate bus masters include disk drives, CD ROM units, and local area network (LAN) devices.

Associated with each line of cache memory 106 is address tag and state information. The address tag indicates a physical address in system memory 114 corresponding to each entry within cache memory 106. In this embodiment each entry within cache memory 106 is capable of storing a line of data. A line of data consists of four doublewords (where each doubleword comprises 32 bits). It is understood, however, that a line could contain any number of words or doublewords, depending upon the system. It is further understood that a doubleword could consist of any number of bits.

The state information is comprised of a valid bit and a set of dirty bits. A separate dirty bit is allocated for each doubleword within each line. The valid bit indicates whether a predetermined cache line contains valid cache data, while the dirty bits identify the write status of each doubleword within each cache line. In an invalid state, there is no valid data in the corresponding cache memory entry. In a valid and clean state, the cache memory entry contains data which is consistent with system memory 114. In a valid and dirty state, the cache memory entry contains valid data which is inconsistent with system memory 114. Typically, the dirty state results when a cache memory entry is altered by a write operation.

Cache controller 108 includes an address tag and state logic circuit 130 that contains and manages the address tag and state information, a comparator circuit 132 for determining whether a cache hit has occurred, and a snoop write-back circuit 134 that controls the write-back of dirty data within cache memory 106. It will be appreciated by those skilled in the art that cache controller 108 may contain additional conventional circuitry to control well-known caching functions such as various read, write, update, invalidate, copy-back, and flush operations. Such circuitry may be implemented using a variety of specific circuit configurations. Examples of such specific circuit configurations may be found in a host of publications of the known prior art, including U.S. Pat. No. 5,091,875 issued to Rubinfeld on Feb. 25, 1992 and U.S. Pat. No. 5,091,876 issued to Sachs et al. on Feb. 25, 1992.

As stated previously, each line of data within cache memory 106 is associated with four doublewords of data. Address tag and state logic circuit 110 indicates a physical address in system memory 114 corresponding to each line entry within cache memory 106, and further stores a valid bit and a set of dirty bits associated with each line of data. A separate dirty bit is provided for each doubleword of data within each line. As will be better understood from the following, the snoop write-back control circuit 134 monitors cycles executing on local bus 112 and detects the initiation of a memory cycle (i.e., read or write cycle) by an alternate bus master. It is noted that such a cycle could be initiated by alternate bus master 122 or by integrated peripheral 111 (i.e., if configured as a DMA controller). If a memory cycle initiated by an alternate bus master is detected on local bus 112 and if a corresponding valid line exists within cache memory 106, the snoop write-back control circuit 134 causes the write-back of the dirty doublewords within the corresponding line of cache memory 106. It is noted that rather than writing back the entire line of data, the snoop write-back control circuit 134 causes only those doublewords within the line that are dirty to be written back to system memory 114. In the preferred embodiment, even if the dirty doublewords within a particular line are misaligned, the snoop write-back control circuit 134 executes a burst write cycle to system memory 114 to burst the non-sequential dirty doublewords into system memory 114. This will be better understood from the following.

Figure 2A:
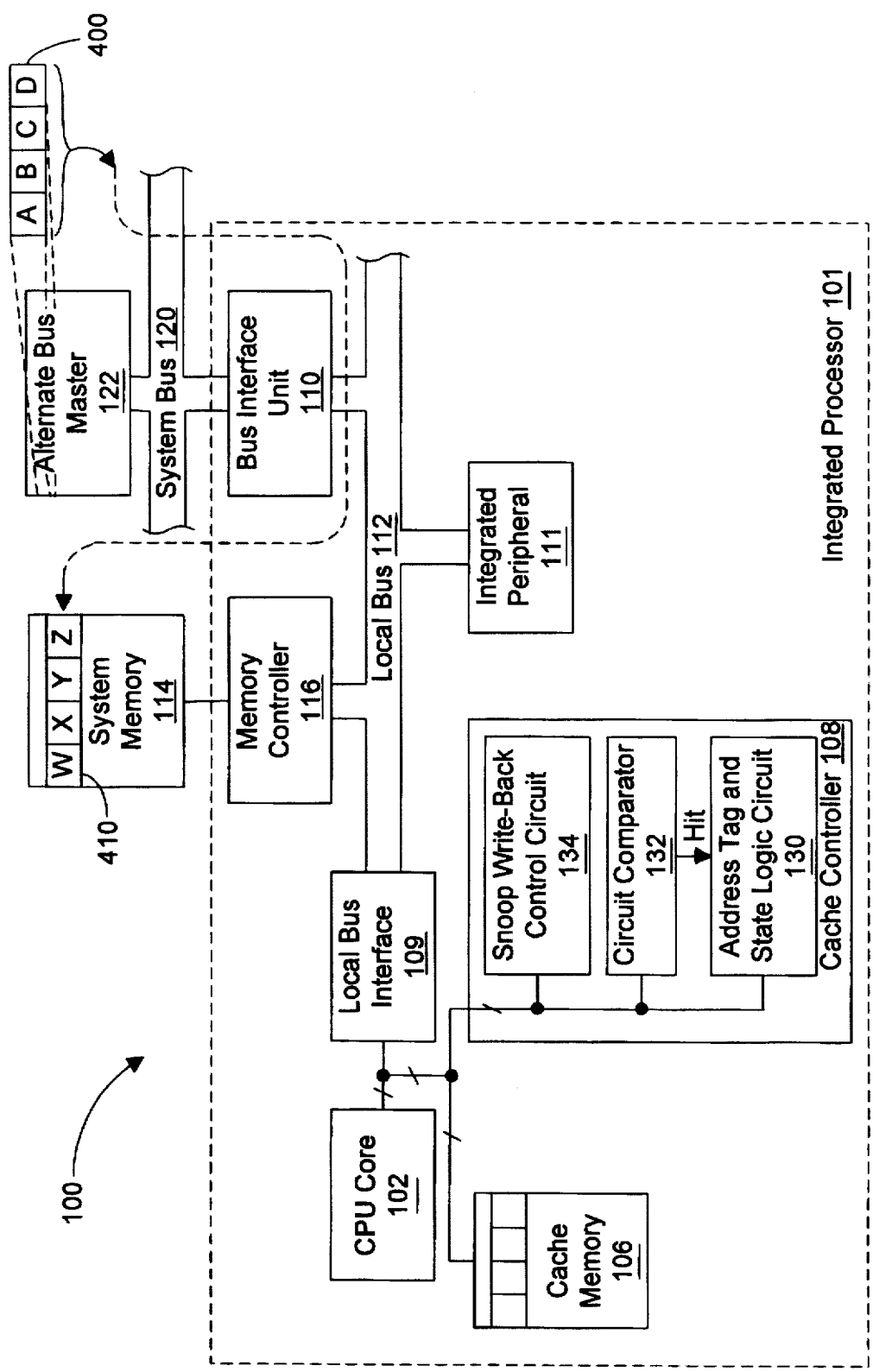
FIGS. 2A–2C are block diagrams that illustrate the flow of data within the computer system of FIG. 1 upon the occurrence of a write cycle by an alternate bus master.
Figure 2B:
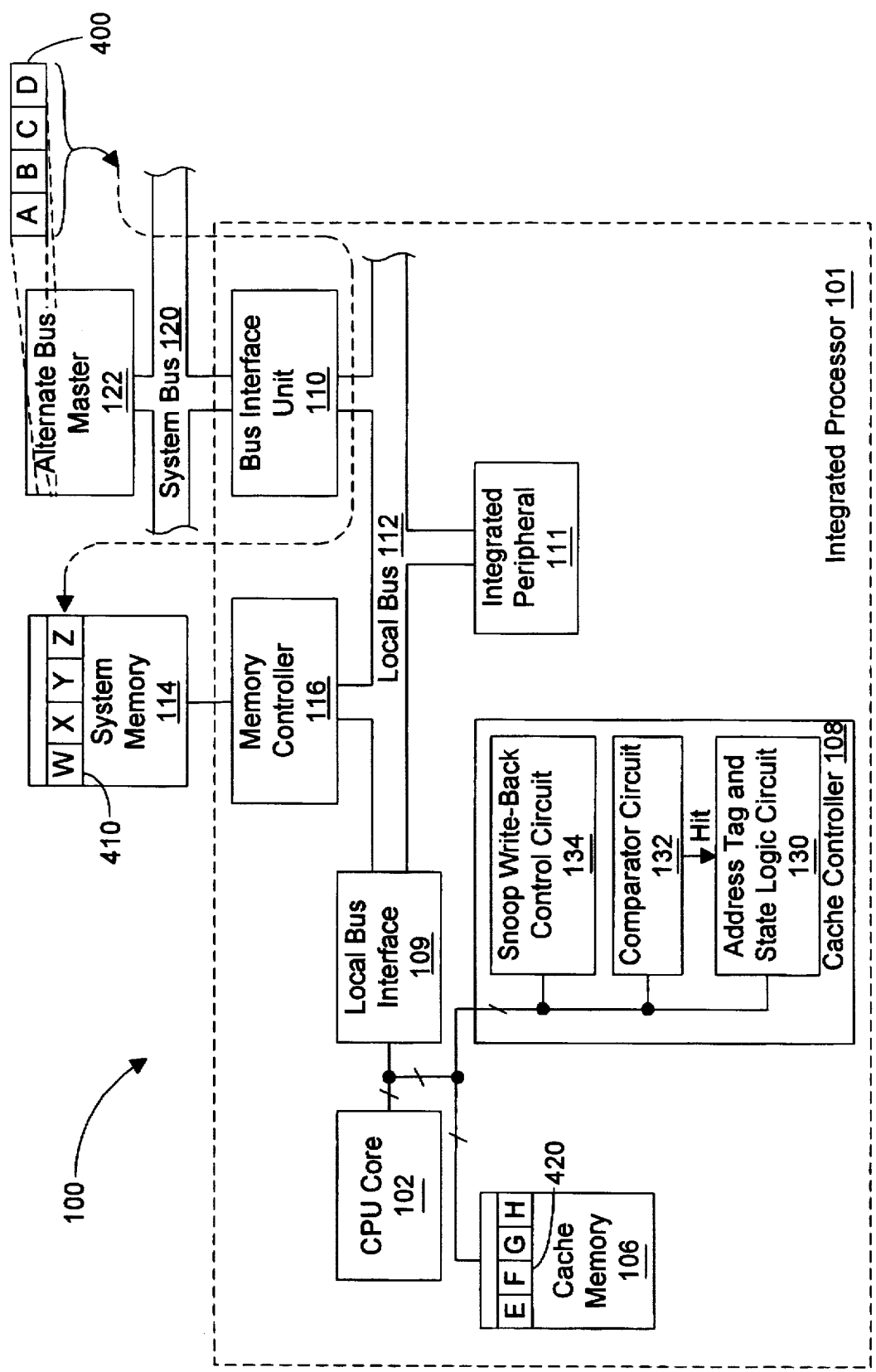
Figure 2C:
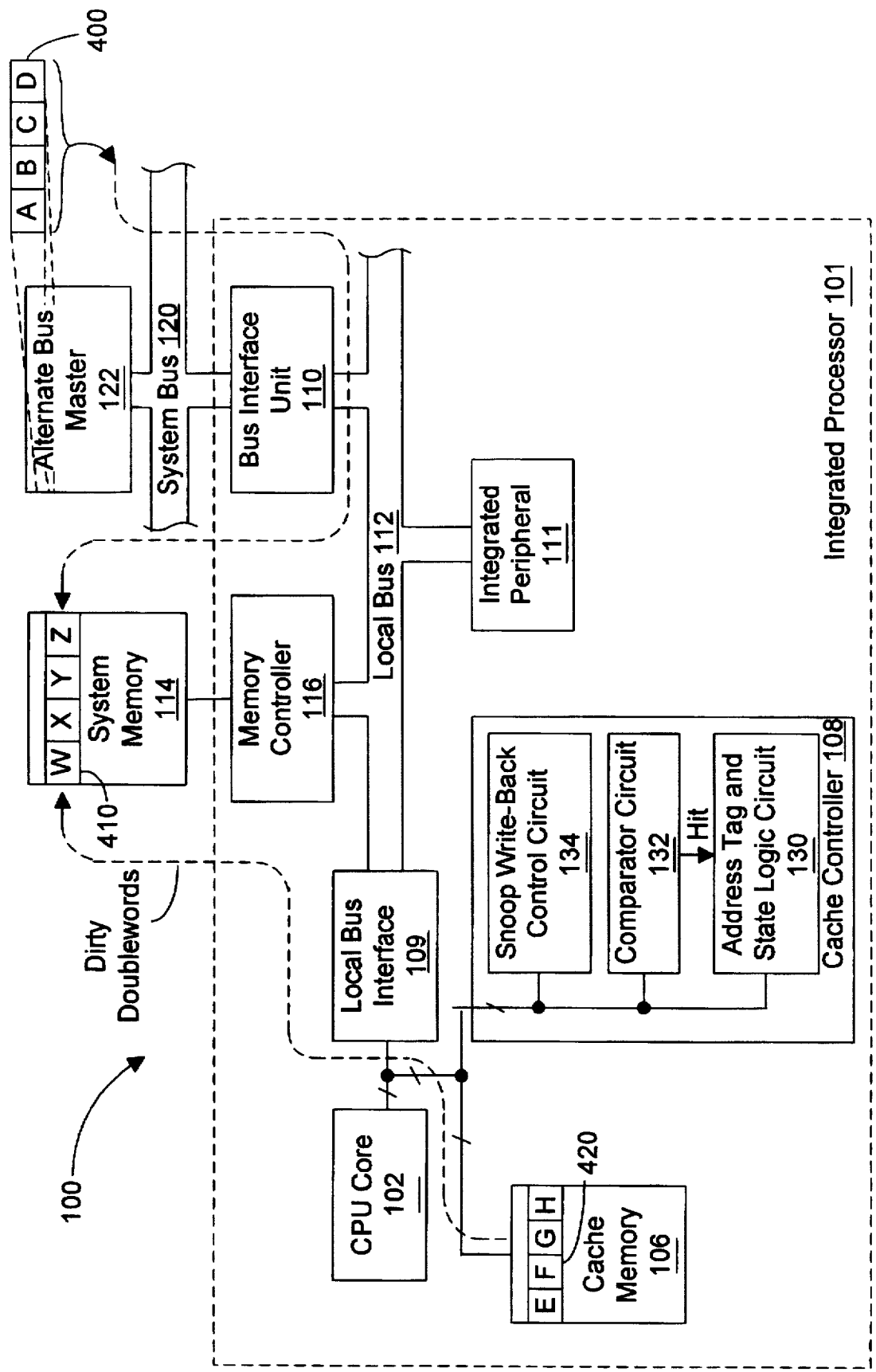

FIGS. 2A–2C are block diagrams that illustrate the flow of data within computer system 100 when a write operation by alternate bus master 122 occurs (i.e., to transfer data from the alternate bus master 120 to system memory 114, or vice versa). It is noted that the flow of data is similar for situations in which integrated peripheral 111 is a bus mastering device. As will be explained in detail below, the particular data transfers that occur during such an operation are dependent upon the status of data (i.e., clean, dirty, invalid) within cache memory 106. If certain doublewords within a particular line of cache memory are dirty and a cache hit occurs, only the doublewords within the line that are dirty are written back to system memory 114.

Referring to FIG. 2A, a write operation is depicted for a situation wherein the alternate bus master 122 desires to write a line of data 400 into a memory region 410 of system memory 114. In this example, line 400 consists of four doublewords "A", "B", "C" and "D", and memory region 410 consists of four address locations "W", "X", "Y" and "Z". When the write operation is initiated, the cycle is detected by snoop write-back control circuit 134 and address tag comparison is made by comparator circuit 132 to determine whether cache memory 106 contains a line of data corresponding to the memory region 410 to which line 400 is to be written (i.e., by comparing the line address on local bus 112 to the address tags within address tag and state logic circuit 130). If cache memory 106 does not contain a corresponding line, a cache miss has occurred and the line 400 of data is transferred into system memory 114. This data transfer is typically accomplished by executing a single burst write cycle on system bus 112 to write the doublewords "A", "B", "C", and "D" into address locations "W", "X", "Y", and "Z", respectively. It is noted, however, that separate write cycles could be executed to transfer the doublewords separately. Since the cache memory 106 in this situation does not contain a line corresponding to memory region 410, a data incoherency does not exist prior to the execution of or after completion of the data transfer. Therefore, there is no need to write-back data or change the status of data within cache memory 106. It is noted that a similar operation occurs if alternate bus master 122 writes a single doubleword to system memory 114.

FIG. 2B illustrates a similar data transfer that is effectuated when a cache "hit" to "clean" data occurs within the cache memory 106 during a DMA write operation. It is noted that alternative bus mater 122 may be executing a cycle to transfer a single doubleword within line 400 or several doublewords within line 400 (i.e., any one or more of the doublewords "A", "B", "C", and "D"). As mentioned previously, a cache "hit" occurs when the cache memory 106 contains an associated line 420 corresponding to the memory region 410 of system memory 114 to which alternative bus master 122 is transferring data. The "hit" line 420 is clean if it contains data that is identical to the corresponding data stored within memory region 410 of system memory 114. That is, line 420 is clean if its component doublewords "E", "F", "G" and "H" are all identical to the doublewords stored within address locations "W", "X", "Y" and "Z", respectively. As illustrated in the figure, when such a DMA write occurs with clean data in the cache, the line 400 is written into memory region 410 by executing a write cycle (i.e., a single write or burst write) on system bus 120 which is correspondingly transferred to local bus 112 via bus interface unit 110. Similar to the previously described transfer of FIG. 2A, the selected doublewords "A", "B", "C", and/or "D" are written into the corresponding address locations "W", "X", "Y", and "Z", respectively. In this case, however, the line 420 residing within cache memory 106 no longer contains the most up-to-date information (i.e., one or more of the doublewords "A", "B", "C", and "D" transferred into memory region 410 have become the new valid data). As a consequence, address tag and state logic circuit 130 invalidates the line 420.

Operation of computer system 100 is next considered for the case in which one or more of the doublewords "E", "F", "G", and "H" within line 420 are marked as dirty by address tag and state logic circuit 130. As will be appreciated by those skilled in the art, a doubleword within line 420 may have been previously marked as dirty by address tag and state logic circuit 130 if the doubleword was written into cache memory 106 from CPU core 102 without updating system memory 114.

FIG. 2C illustrates the data transfers effectuated when alternate bus master 122 attempts to write the line of data 400 (or selected doublewords thereof) to system memory 114 and a cache "hit" occurs with corresponding "dirty" data residing within cache memory 106. When such a situation arises, snoop write-back control circuit 134 causes the alternate bus master 120 to "back-off" and release mastership of local bus 112 (i.e, via bus interface unit 110). The snoop write-back control circuit 134 then causes and of the doublewords "E", "F", "G", and/or "H" within line 420 of cache memory 106 that are marked dirty to be written back into the corresponding locations of memory region 410 of system memory 114. If more than one doubleword is marked dirty, the write-back to system memory 114 of the dirty doublewords of line 420 is preferably accomplished by executing a burst transfer cycle. Such a burst cycle is executed even if the dirty doublewords of line 420 are misaligned or non-sequential, as will be explained in greater detail below. Following the write-back to system memory 114, the line 420 within cache memory 106 is marked as invalid, and the alternate bus master 120 is allowed to perform its desired data transfer. In accordance with the snoop write-back cycle, data coherency is maintained.

Figure 3:
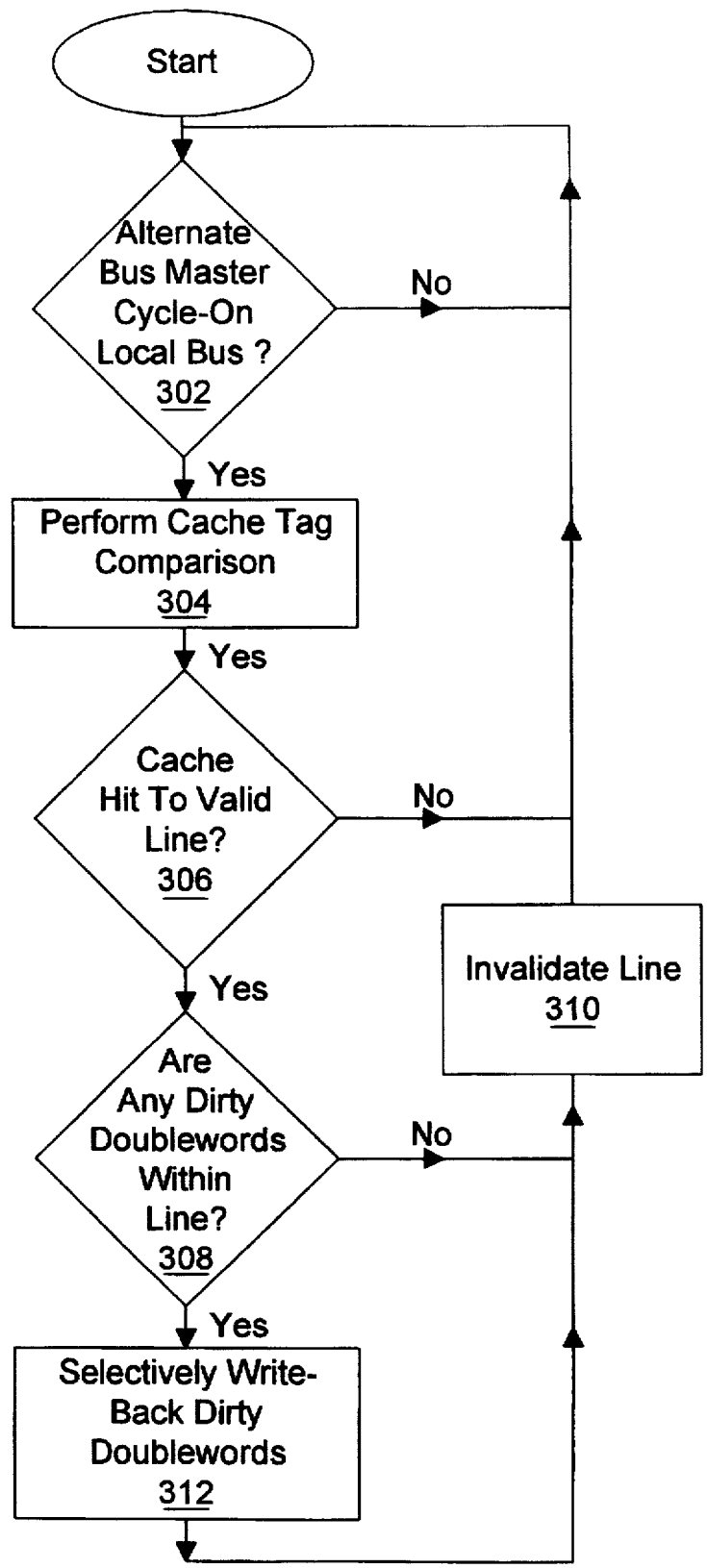
FIG. 3 is a flow diagram that illustrates the operation of the cache controller of FIG. 1.

FIG. 3 is a flow diagram that illustrates the operation of cache controller 108. If a cycle on local bus 112 is detected by snoop write-back control circuit 134 during step 302, a cache tag comparison operation is performed during step 304. If a cache hit to a valid line occurs, as determined by step 306, it is determined whether any dirty doublewords exist within the hit line (step 308). If no dirty doublewords exist within the hit cache line, the line is invalidated during step 310. On the other hand, if one or more dirty doublewords are present within the line, the individual dirty doublewords are written to system memory 114 during step 312. Subsequently, the cache line is invalidated during step 310. It is noted that cache controller 108 may be configured to invalidate a particular hit cache line during step 310 only if the cycle executing on local bus 112 is a write cycle (i.e., a hit cache line may not necessarily be invalidated if the local bus cycle executed by the alternate bus master is a read cycle).

Figure 4:
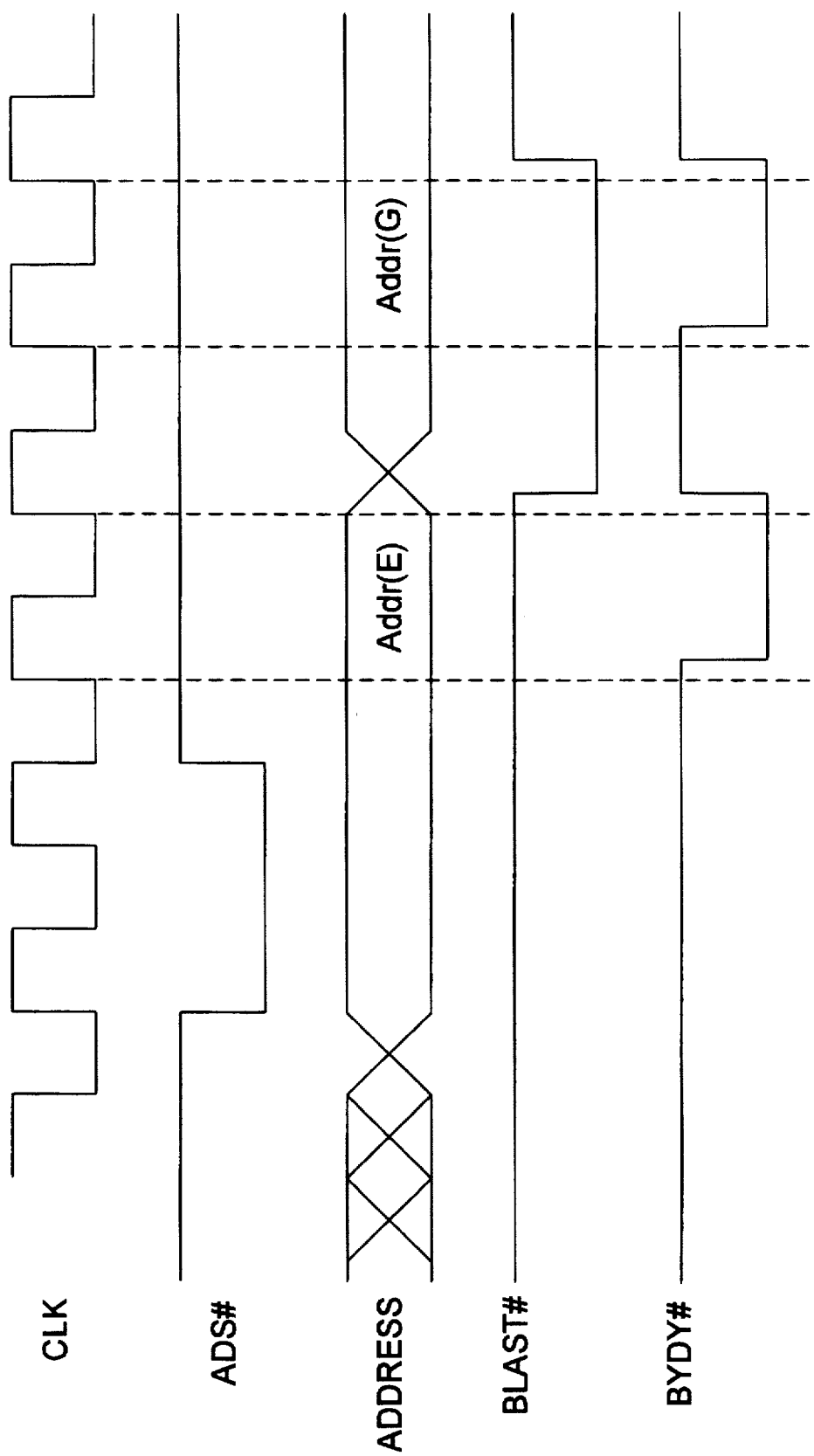
FIG. 4 is a timing diagram that illustrates a burst cycle executed by a snoop write-back control circuit to burst non-sequential cached dirty data into a system memory.

FIG. 4 is a timing diagram that illustrates various signals on local bus 112 that are asserted during a write-back operation of non-sequential dirty doublewords within cache memory 106. If, for example, a snoop write-back operation is executed to write the doublewords "E" and "G" back to system memory 114 (i.e., FIG. 2C), a burst cycle is executed by snoop write-back control circuit 134. The burst write cycle is initiated upon the assertion of the address strobe signal ADS#. Initially, the addressing lines of local bus 112 are driven with a value corresponding to the address of doubleword "E". When the memory controller 116 has accepted the doubleword "E", it asserts the BRDY# signal. Subsequently, the snoop write-back control circuit 134 drives the addressing lines of local bus 112 with a value corresponding to the address of doubleword "G" and simultaneously asserts the BLAST# signal to inform memory controller 116 that the cycle will complete when the transfer of doubleword "G" is effectuated. The memory controller 116 again asserts the BRDY# signal when it has received the doubleword. It is noted that memory controller 116 must be configured to resample or detect the address lines of local bus 112 prior to asserting the signal BRDY# to determine whether the doubleword address has changed to specify a non-sequential doubleword. In one embodiment, the memory controller 116 may only resample the two lower order bits of the addressing lines following initiation of a given burst writeback cycle to determine whether a non-sequential doubleword is being written back. The memory controller 116 may further be configured to assume normal burst ordering if the address signal does not change during the given burst cycle.

The cache controller 108 may be reduced to a sequential logic circuit by employing computer-aided design tools. Exemplary computer-aided design tools include the behavioral language Verilog as well as the VHSIC hardware description language.

It is noted that the present invention may be implemented in conjunction with a variety of other bus transfer techniques and alternative system configurations. For example, the present invention may be implemented in conjunction with systems employing either non-pipelining or pipelining techniques. Similarly, the present invention may be implemented within multi-processor and/or multi-cache systems.

Numerous variations and modifications will become apparent to those skilled in the art once the above disclosure is fully appreciated. For example, the number of words that comprise a predefined line within the cache memory may vary without departing from the spirit and scope of the present invention. It is intended that the following claims be interpreted to embrace all such variations and modifications.

What is claimed is:

1. A computer system comprising:
   a bus configured to transfer data signals;
   a cache memory operatively coupled to said bus;
   a processing unit coupled to said cache memory;
   a system memory;
   a system memory controller operatively coupled to said bus and to said system memory for controlling storage and retrieval of data within said system memory;
   an alternate bus master device coupled to said bus, wherein said alternate bus master device is capable of executing a memory cycle on said bus; and
   a cache controller operatively coupled to said cache memory and to said bus for controlling the storage and retrieval of data within said cache memory, wherein said cache controller includes:
      a tag logic circuit configured to store a plurality of line addresses indicative of a plurality of lines of data stored within said cache memory and configured to store a plurality of dirty bits associated with each line, wherein a separate dirty bit corresponds to a separate doubleword of data within each line; and
      a snoop control circuit configured to control a write-back to said system memory of dirty data stored within said cache memory wherein said snoop control circuit is configured to selectively write-back selected non-sequential doublewords of a given line that are dirty based upon a status of said plurality of dirty bits by asserting an address of a first of said selected non-sequential doublewords on said bus during a first period of a burst write cycle and by modifying a predetermined number of lower order bits of said address to specify an address of a second of said selected non-sequential doublewords during a second period of said burst write cycle;
   wherein said system memory controller is configured to sample said predetermined number of lower order bits of said address during said second period of said burst write cycle to determine if a non-sequential doubleword is being written back.

2. The computer system as recited in claim 1 wherein said alternate bus master device is a DMA controller.

3. The computer system as recited in claim 1 wherein said alternate bus master device is a bus bridge.

4. The computer system as recited in claim 1 wherein said snoop control circuit is configured to invalidate a hit line of data stored within said cache memory in response to said memory cycle of said alternate bus master.

5. The computer system as recited in claim 1 wherein said write-back to said system memory of said dirty data stored within said cache memory occurs after selected data is transferred said selected data being transferred during a given burst cycle from said alternate bus master device to said system memory.

6. An integrated processor comprising:

a CPU core;

a bus operatively coupled to said CPU core and configured to transfer data signals;

a cache memory operatively coupled to said bus;

a system memory controller operatively coupled to said bus configured to control the storage and retrieval of data within a system memory;

an alternate bus master device coupled to said bus, wherein said alternate bus master device is configured to execute a memory cycle on said bus; and a cache controller operatively coupled to said cache memory and to said bus configured to control the storage and retrieval of data within said cache memory, wherein said cache controller includes:

a tag logic circuit configured to store a plurality of line addresses indicative of a plurality of lines of data stored within said cache memory and configured to store a plurality of dirty bits associated with each line, wherein a separate dirty bit corresponds to a separate doubleword of data within each line; and a snoop control circuit configured to control said write-back to said system memory of dirty data stored within said cache memory wherein said snoop control circuit is configured to selectively write-back selected non-sequential doublewords of a given line that are dirty based upon a status of said plurality of dirty bits by asserting an address of a first of said selected non-sequential doublewords on said bus during a first period of a burst write cycle and by modifying a predetermined number of lower bits of said address to specify an address of a second of said selected non-sequential doublewords during a second period of said burst write cycle;

wherein said system memory controller is configured to sample said predetermined number of lower order bits of said address during said second period of said burst write cycle to determine if a non-sequential doubleword is being written back.

7. The integrated processor as recited in claim 6 wherein said alternate bus master device is a DMA controller.

8. The integrated processor as recited in claim 6 wherein said alternate bus master device is a bus bridge.

9. The integrated processor as recited in claim 6 wherein said snoop control circuit is configured to invalidate a hit line of data stored within said cache memory in response to said memory cycle of said alternate bus master.

10. The integrated processor as recited in claim 6 wherein said write-back to said system memory of said dirty data stored within said cache memory occurs after selected data is transferred, said selected data being transferred during a given burst cycle from said alternate bus master device to said system memory.

11. A snoop control method for a cache-based computer system comprising the steps of:

storing a plurality of line addresses indicative of a plurality of lines of data within a cache memory;

storing a plurality of dirty bits associated with each line, wherein a separate dirty bit corresponds to each doubleword of data within each line;

initiating a memory cycle to transfer data from an alternate bus master to a system memory;

detecting said memory cycle within a cache controller;

determining whether a corresponding line resides within said cache memory;

selectively writing back to said system memory non-sequential doublewords within said corresponding line that are indicated to be dirty by a status of said plurality of dirty bits, wherein said selectively writing back includes asserting an address of a first of said selected non-sequential doublewords on said bus during a first period of a burst write cycle and modifying a predetermined number of lower bits of said address to specify an address of a second of said selected non-sequential doublewords during a second period of said burst write cycle; and sampling said predetermined number of lower order bits of said address during said second period of said burst write cycle to determine whether said next doubleword is a sequential or non-sequential doubleword.

12. The snoop control method as recited in claim 11 comprising a further step of invalidating said corresponding line.

* * * * *